United States Patent [19]

Sabel

[11] 4,397,599
[45] Aug. 9, 1983

[54] DESCENDING ACCUMULATOR FOR AUTOMATIC CASE PACKER

[76] Inventor: Herbert J. Sabel, 543 Avenue Del Oro, Sonoma, Calif. 95476

[21] Appl. No.: 331,252

[22] Filed: Dec. 16, 1981

[51] Int. Cl.³ .............................................. B65G 57/10
[52] U.S. Cl. ........................................ 414/46; 53/540;
198/420; 198/422; 198/458; 270/58; 414/68;
414/89; 414/98
[58] Field of Search ......................... 414/29, 46, 47, 68,
414/69, 89, 98; 198/420, 422, 458, 793; 53/537,
540; 270/58

[56] References Cited

U.S. PATENT DOCUMENTS

| | | | |
|---|---|---|---|
| 2,831,586 | 4/1958 | Patrick | 414/46 X |
| 3,220,158 | 11/1965 | Roser et al. | 414/46 X |
| 3,412,843 | 11/1968 | Maulini | 198/420 X |
| 3,605,377 | 9/1971 | Sabel | 53/537 X |
| 4,068,766 | 1/1978 | Schmitt | 414/52 |

Primary Examiner—Leslie J. Paperner
Attorney, Agent, or Firm—Owen, Wickersham & Erickson

[57] ABSTRACT

An apparatus is disclosed for automatically stacking and progressively accumulating a plurality of identical articles so that they can be loaded as a unit into a shipping container. The apparatus comprises a pair of indexing chains guided in low-friction tracks on a descending angle and driven by sprockets which are indexed periodically by a rotary drive. A series of trays is supported between the chains, each tray being sized to accommodate a full case load of product. The descending angle of the chains is such that the trays on the upper side of the chains are always arranged horizontally to form descending accumulation stations at levels that are spaced apart by a distance equal to the height of the product. Infeed conveyor belts are located on one or both sides of the accumulation stations for bringing in the articles to be stacked, and a lateral, horizontally directed actuator is provided to transfer them from the conveyor belts to the trays. At the lower end of the chains, each fully accumulated unit of articles is transferred laterally by another actuator to a platform, such as an elevator, for loading into a shipping container.

10 Claims, 9 Drawing Figures

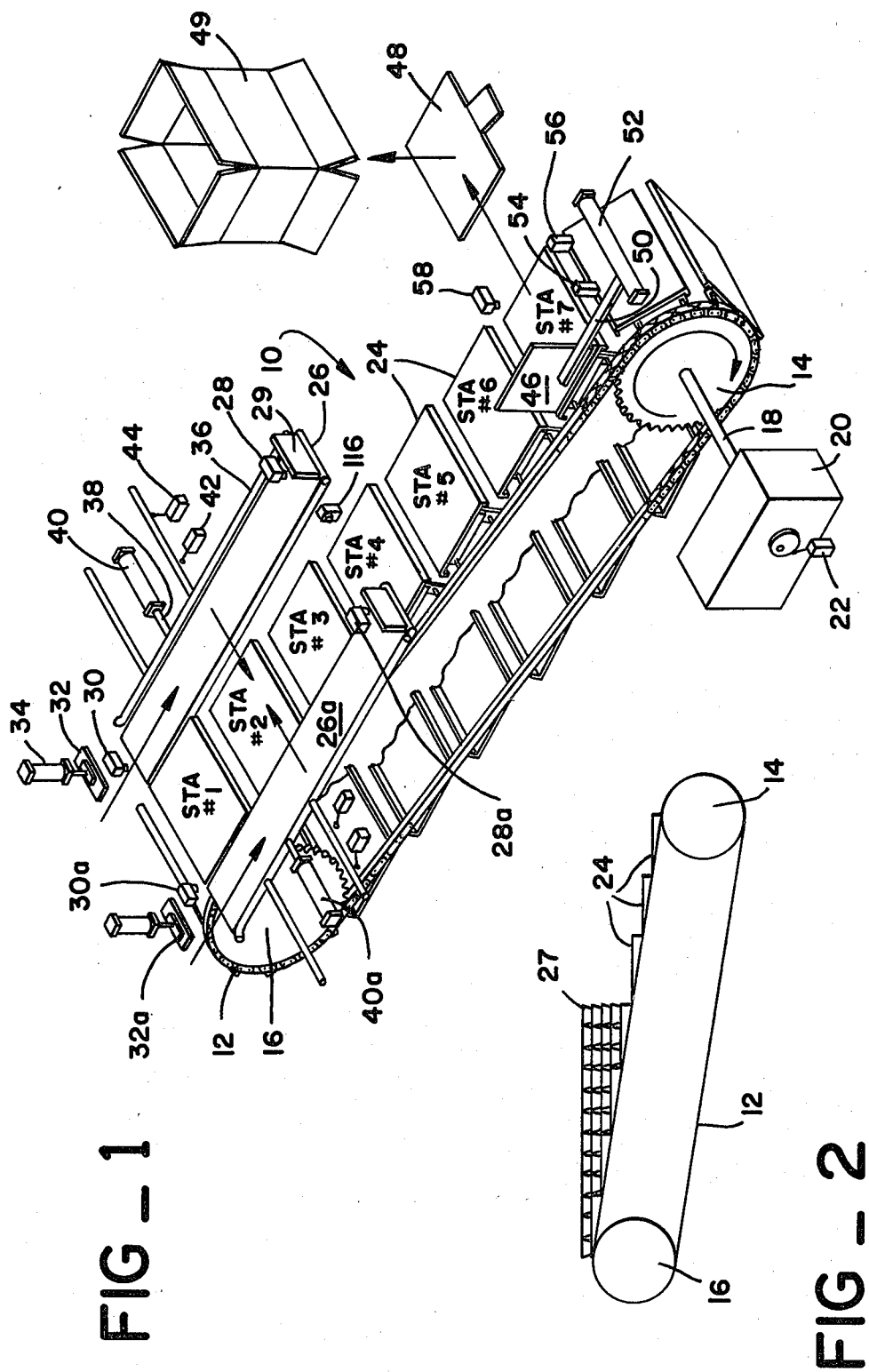

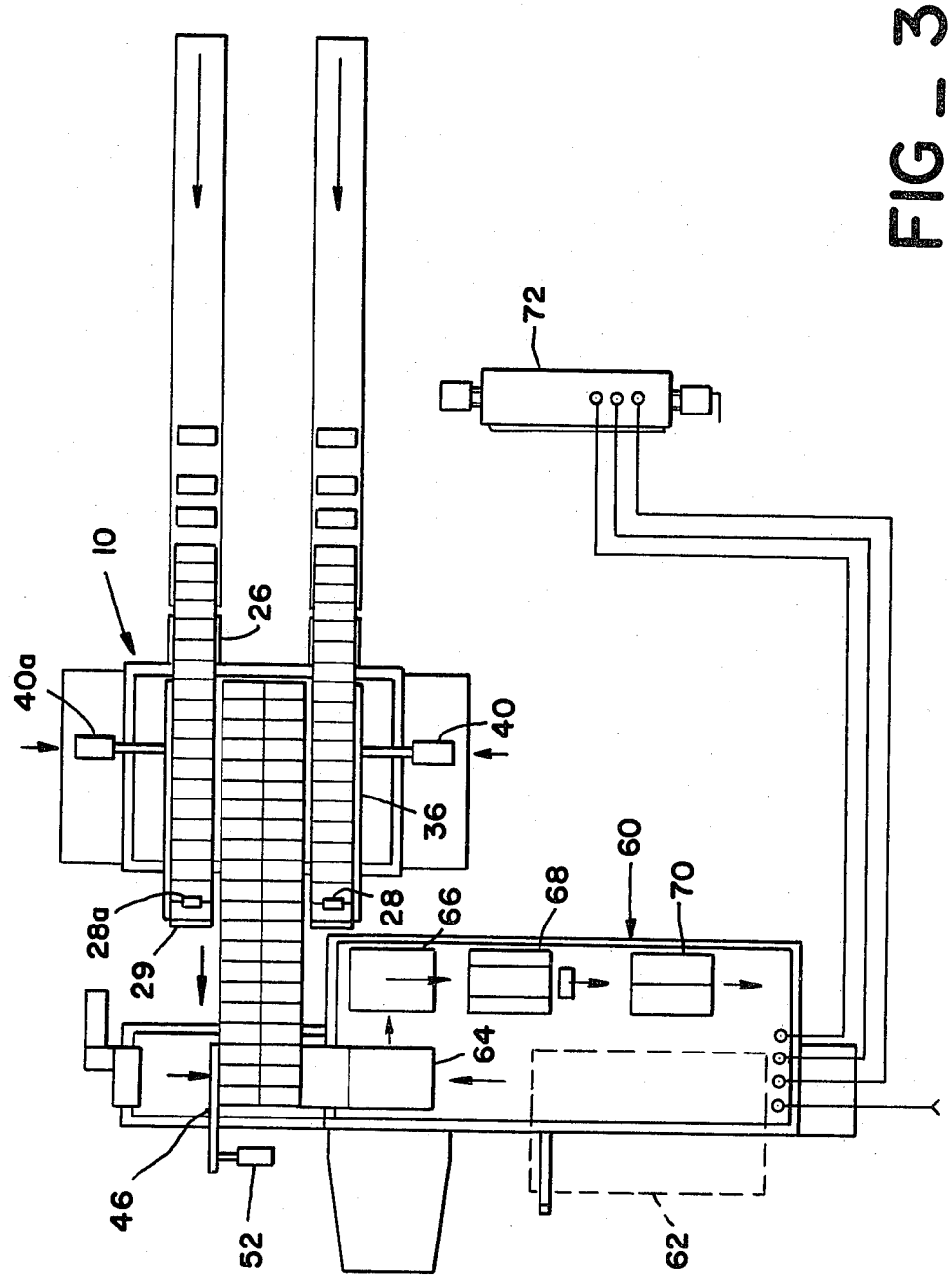

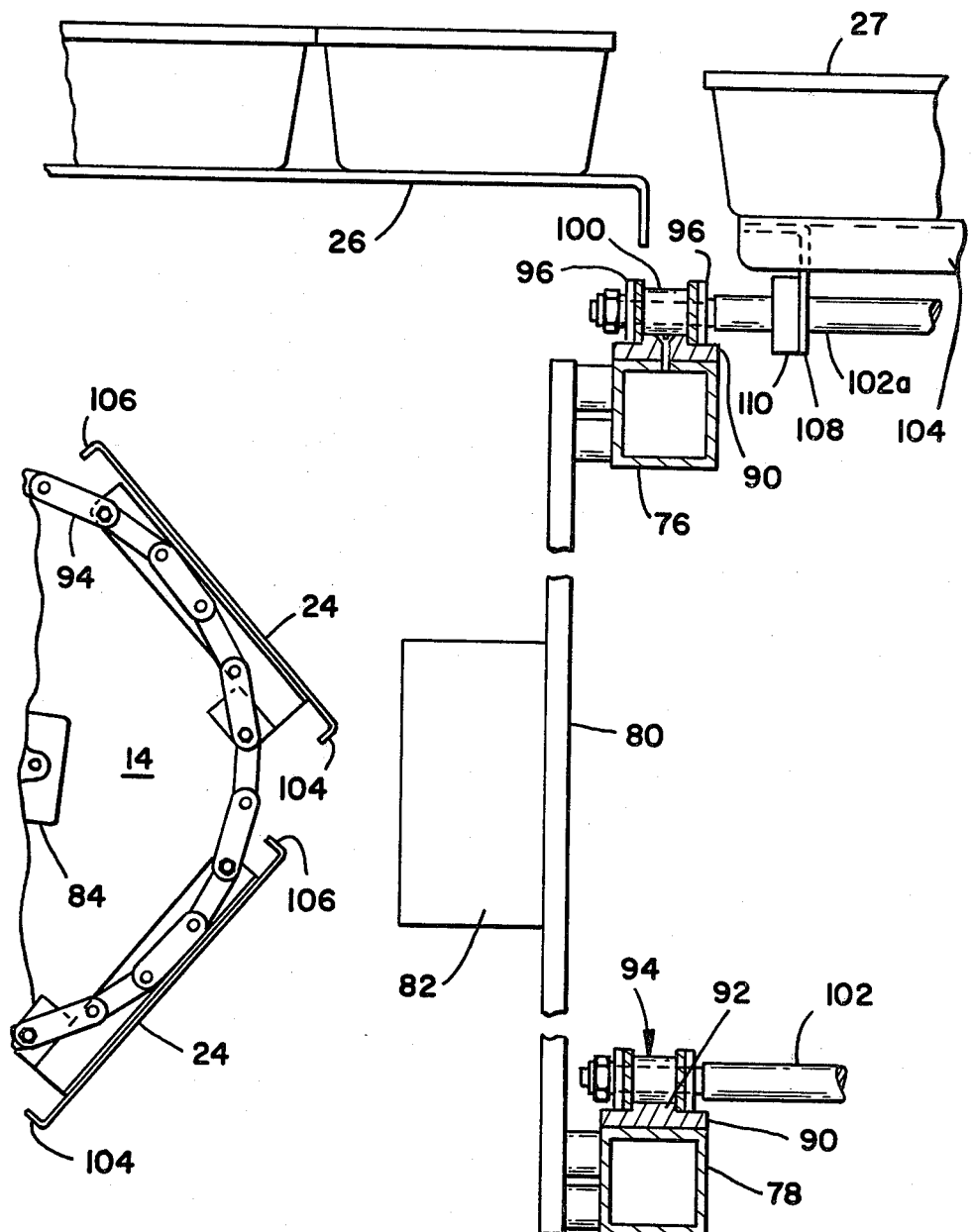

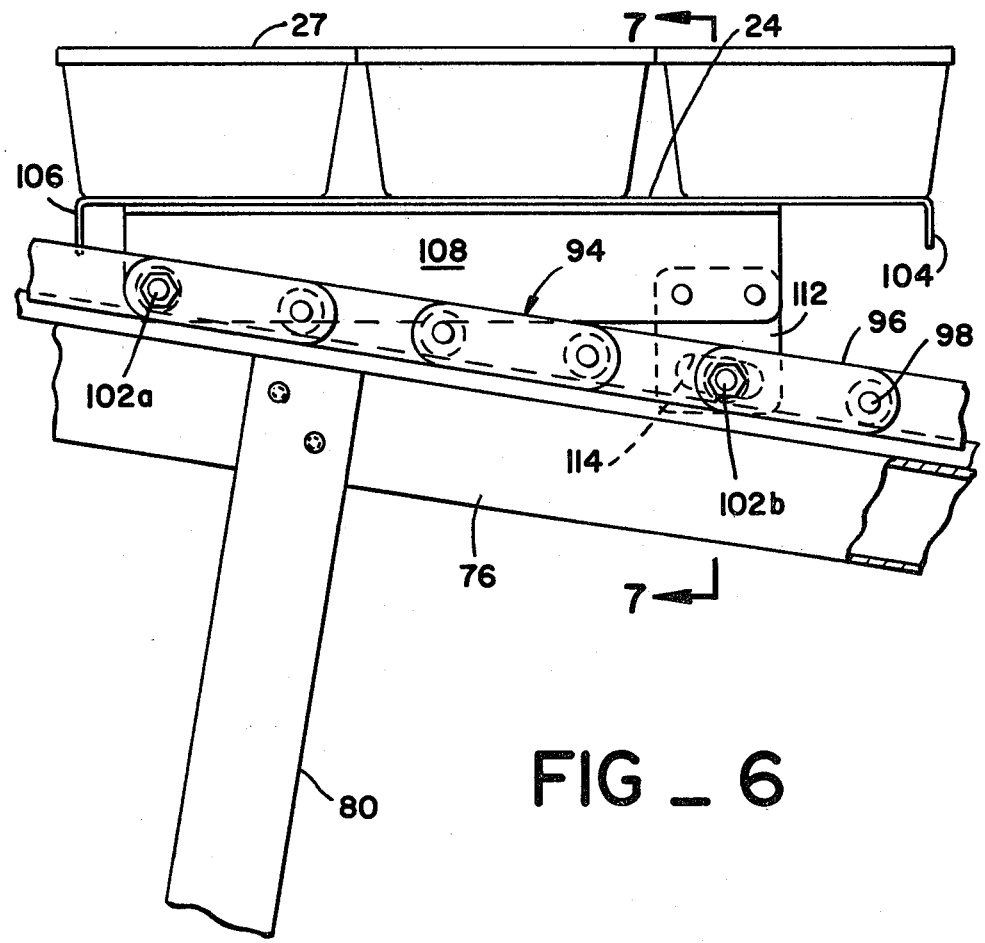
FIG_6
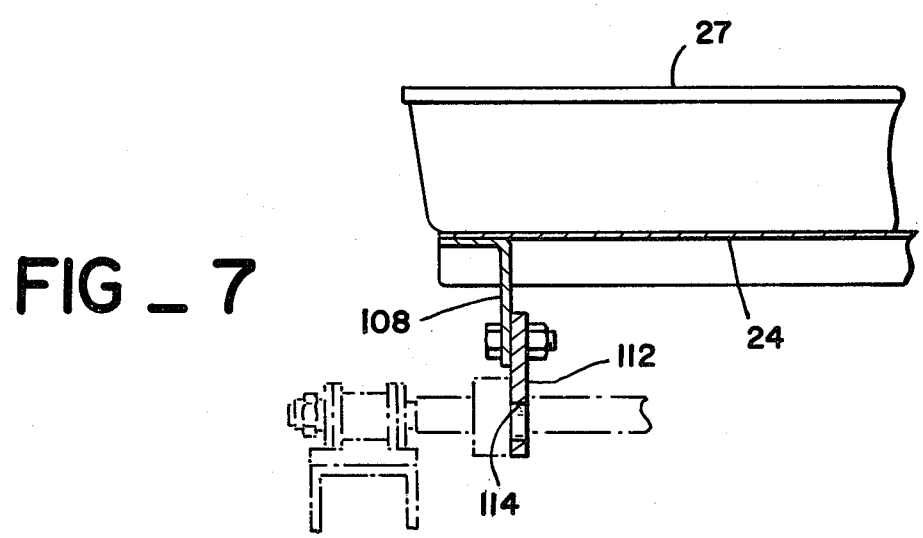
FIG_7

4,397,599

DESCENDING ACCUMULATOR FOR AUTOMATIC CASE PACKER

This invention relates to an apparatus for accumulating and stacking a plurality of articles for subsequent loading into a shipping container.

BACKGROUND OF THE INVENTION

An accepted procedure for packing a shipping container with a plurality of like articles or product, such as cans, cartons, or packages, is to accumulate and stack the product before it is loaded into the container. A particularly efficient method for loading a standard corrugated shipping container is to insert a stack of accumulated product through its open bottom. An apparatus for carrying out this bottom loading method is shown in U.S. Pat. No. 3,605,377.

To increase the production rate and efficiency of such carton loading apparatus, it is necessary to solve the problem of stacking and accumulating the product in a precise manner and at a high rate. Moreover, it is essential that the stacking operation be accomplished automatically and yet without damaging the product. Usually, the product is supplied in a constantly moving stream or line from a conveyor belt and from this line the individual product elements must be maneuvered and stacked into the desired accumulation. In prior apparatus for accumulating or stacking articles, they were first moved from the conveyor to an intermediate station and then pushed onto a vertically movable loading platform. After each tier of articles was positioned onto the loading platform, it was lowered to receive the next tier of articles. Such an arrangement was functional but relatively slow and a serious disadvantage where a high output rate is required. Previous attempts to solve this problem resulted in relatively complicated and impractical machines adaptable for use with only certain specialized products, such as the apparatus for stacking bricks, described in U.S. Pat. No. 4,068,766.

It is, therefore, a general object of the present invention to provide an improved apparatus for accumulating and stacking a plurality of product for subsequent loading into a shipping container; to provide an accumulating and stacking apparatus that will operate automatically at a relatively high cycling rate; and to provide a product stacking apparatus that is particularly adaptable for operation with a bottom carton loading machine.

SUMMARY OF THE INVENTION

The aforesaid objects of the invention are accomplished by an apparatus comprising, in a preferred embodiment, a pair of continuous chains that are spaced apart and supported by drive and idler sprockets. The drive sprockets are arranged at a lower level than the idler sprockets so that the chains are sloped at a predetermined angle. Supported between the chains is a plurality of trays for the stacked product, each tray being sized to support a full case load of accumulated product. The descending angle of the chains is such that the trays on the upper side of the chains are always arranged horizontally to form descending accumulation stations at levels that are spaced apart by a distance equal to the height of the product. Infeed conveyor belts are located on one or both sides of the accumulation stations for bringing in the articles to be stacked. A system of sensors and switches control the loading of the conveyor belts with a predetermined number of product units. Once loaded, a horizontally directed actuator moves product from the conveyor belts onto the adjacent trays. Upon starting the apparatus, the trays are preloaded so that there is a continuous flat surface adjacent the belt to receive the product being transferred laterally. After each lateral transfer of product from the conveyors, the drive sprockets and, thus, the chains and trays, are indexed by the distance of one tray length, thereby creating another flat surface adjacent the conveyor belts as the fully loaded trays are advanced. At the lower end of the chains, each fully accumulated unit of product is transferred laterally to a loading platform by another automatically controlled actuator. The loading platform may be an elevator of a bottom loading container packing apparatus. Thus, with the present invention, a continuous line or stream of product can be automatically accumulated, stacked, and then loaded into a shipping container without interruption.

Other objects, advantages and features of the invention will become apparent from the following detailed description of one preferred embodiment presented in conjunction with the accompanying drawing.

BRIEF DESCRIPTION OF THE DRAWING

FIG. 1 is a fragmentary and partially schematic view in perspective of an article stacking and accumulating apparatus according to the present invention;

FIG. 2 is a diagrammatic side view in elevation of the apparatus of FIG. 1;

FIG. 3 is a partially diagrammatic plan view of the apparatus of FIG. 1 shown with articles accumulated for loading by a typical carton loading machine;

FIG. 5 is an enlarged fragmentary view in elevation and in section showing a portion of the apparatus of FIG. 1;

FIG. 6 is a fragmentary view in side elevation and in section showing one partially loaded tray;

FIG. 7 is a fragmentary view in section taken at line 7—7 of FIG. 6;

FIG. 9 is a fragmentary view in elevation showing the forward end of the apparatus of FIG. 1.

DETAILED DESCRIPTION OF EMBODIMENT

Figure 8:
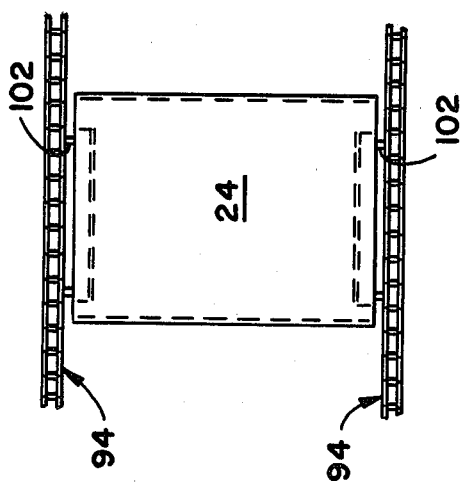
FIG. 8 is a fragmentary plan view of one tray for the apparatus of FIG. 1.

With reference to the drawing, FIG. 1 shows, somewhat diagrammatically, an apparatus 10 embodying the principles of the invention as it appears before receiving any articles to be stacked and accumulated for loading into containers. In general, the apparatus comprises a pair of continuous chains or belts 12, each of which extends around a drive sprocket 14 at its front end and an idler sprocket 16 at its rear end. The drive sprockets are spaced from the idler sprockets and are at a lower elevation. The drive sprockets of the two chains are connected by a common shaft 18 which is turned by a rotary drive unit indicated by numeral 20. This drive includes a suitable electrical motor and gear box (not shown) and is controlled by a cam actuated switch 22 which causes the drive to operate intermittently to move the drive sprockets 14 and, thus, the chains 12, forwardly a predetermined distance before stopping. Attached to and extending between the parallel and spaced apart chains is a series of trays 24. Although the chains slope downwardly toward their forward ends, the trays are attached so that they remain horizontal and step downwardly toward the forward end of the apparatus, as shown in FIG. 2.

Located on one or both sides of the stepped trays at the upper or rear ends of the chains is a pair of infeed means such as conveyor belts 26. If desired, each infeed means could be a flat plate coplanar with a conveyor belt at one end. Each input belt or plate receives a moving line of articles 27 to be stacked and positions a group of such articles in a line. As the articles are moved along the infeed means, they are pushed against a barrier plate 29 at its outer end. A first sensor 28, such as a photocell, is also located near the outer end of each belt and detects the presence of articles against the barrier. A second photocell 30, located at the inlet end of each conveyor belt, has a time delay and is positioned to indicate when the conveyor belt is full. Signals from the photocells 28 and 30 control a movable feed stop 32 near the conveyor inlet. Each stop may comprise a movable barrier member connected to the vertically oriented piston of an actuator 34.

Adjacent to the outer edge of each conveyor belt 26 is a movable article pushing fence 36 connected to the piston rod 38 of a linear actuator 40. The travel limits of each actuator piston and, thus, the fence 36, are controlled by a pair of spaced apart position switches 42 and 44.

Near the drive sprockets 14 at the lower forward end of the apparatus is a movable pushing fence 46 that functions to move an accumulated stack of articles from the lowermost horizontal tray to another surface for ultimate loading into a shipping container or carton 49. Such a machine as the pushing fence 46 is connected by an arm 50 to a linear actuator 52 whose travel limits are controlled by a pair of position switches 54 and 56. The timing of the actuator 52 is controlled by a photocell 58 which serves to provide a control signal whenever a fully loaded tray moves into its lowermost position and is ready to be unloaded.

In the plan view of FIG. 3, an accumulating apparatus 10 according to the invention is shown in combination with a bottom loading carton machine 60. Such a machine, as more fully described in U.S. Pat. No. 3,605,377, generally includes a folded carton magazine station 62, a bottom loading station 64 that receives each group of stacked articles, flap closing stations 66 and 68, and a sealing station 70, all of which are activated automatically by a suitable control system 72. Other forms of stacked article handling devices could, of course, also be used with the apparatus 10.

Figure 4:
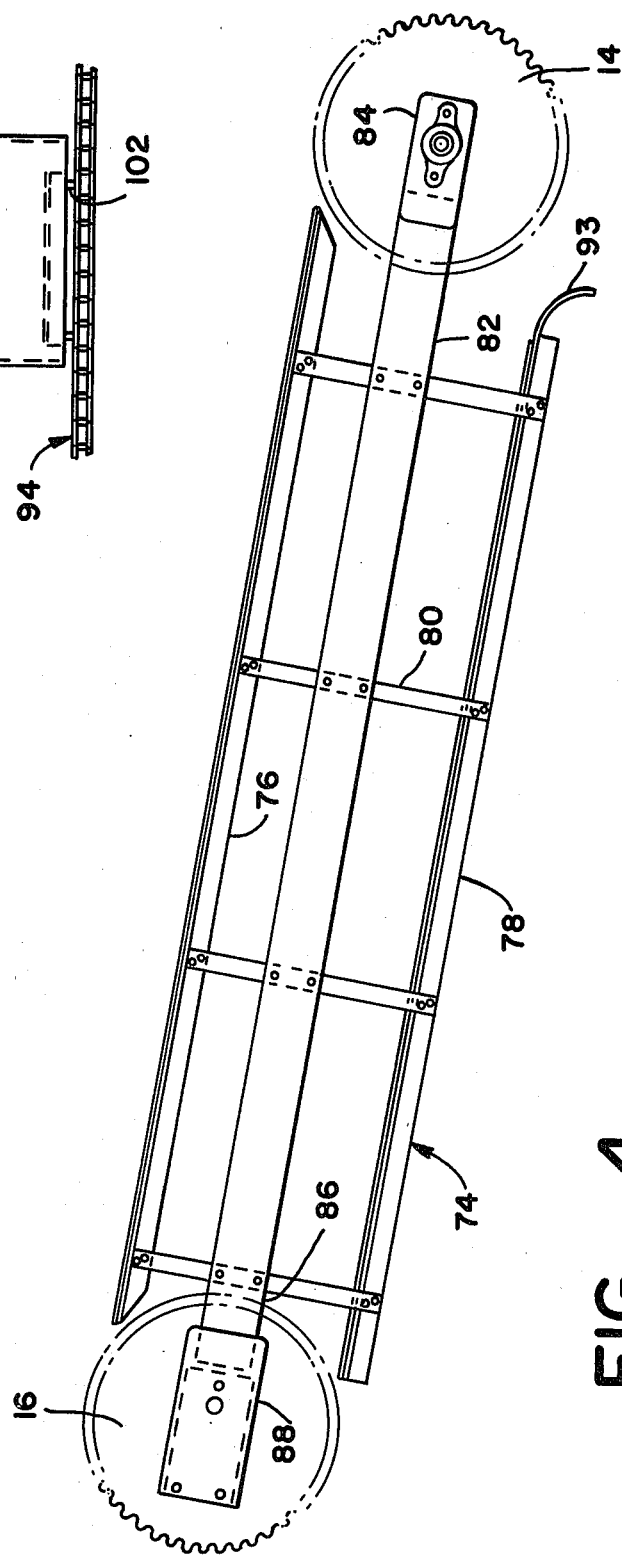
FIG. 4 is a fragmentary view in side elevation showing a chain support frame for the apparatus of FIG. 1.

Now, as shown in greater detail in FIG. 4, the front and rear sprocket wheels 14 and 16 are mounted on a pair of frames 74. Each frame is comprised of a pair of parallel and spaced apart upper and lower guide members 76 and 78, interconnected by a series of cross members 80. Attached to and extending forwardly from one cross member at the forward end of each frame is a support member 82 for a suitable bearing 84 for the sprocket shaft 18. A similar support member 86 extends rearwardly from another cross member with a bearing 88 for the rear sprocket 16 on each frame.

The guide members 76 and 78 on each frame are preferably metal with a cross section sufficient to provide adequate rigidity and strength. As shown in FIG. 5, guide members having a square cross section may be used, and attached to the top surface of each, is a guide strip 90 with a central ridge portion 92 adapted to fit between the opposite walls of the chain links, thereby keeping them aligned. A curved deflector 93 is attached to the lower rail to cause the chain to move from the forward sprocket up onto the top of the lower guide member. Thus, the guide members always support the full weight of the chains and their trays, and, therefore, the chains will not sag during their return movement from the front sprockets to the rear sprockets.

Each chain is comprised of a plurality of links 94 formed by pairs of elongated, spaced-apart plates 96 pivotally connected by cylindrical pins 98 extending through tubular spacers 100 between each pair of link plates. The plates of adjacent connecting links overlap and are retained by one pin 98 in the conventional manner. At certain preselected spaced-apart locations on the chain, special elongated pins 102 are provided which extend from the link of one chain to a similar link of the other chain. As shown in FIG. 6, each tray 24 is supported by two elongated pins 102a and 102b.

Each tray is rectangular, as shown in FIG. 8, and may be formed of sheet metal having a uniform thickness that is sufficient to provide adequate strength and rigidity for supporting the stacked product. Preferably, the front and rear leading edges have bent-down flanges 104 and 106 in order to increase rigidity and assure a smooth level surface for the products being conveyed. Fixed to the underside of each tray, as shown in FIG. 7, is a pair of right angle members 108 whose vertical flanges extend parallel to the chains. Fixed to the rear ends of the aforesaid vertical flanges are bushings 110 through which one of the elongated pins (102a) extends to support the rear end of a tray. To the front end of each vertical flange of each right angle member is fixed a tab member 112 that extends downwardly and forms a bearing hole 114 for the second one of each pair of elongated pins (102b). These bearing holes 114 are actually elongated slots which are provided in order to allow the pins 102b to move back and forth as each tray is moved freely by the chains around the sprocket wheels, as shown in FIG. 9. The two right angle members 108 for each tray are spaced close enough together so that they are positioned well inside of and do not interfere with movement of the chains themselves, as seen in FIG. 5.

The operation of a stacking and accumulating apparatus 10 according to the invention may be completely automatic using appropriately located limit switches, photocells, or other conventional position sensors, together with controllable actuators, such as air cylinders, plus a suitable clutch/brake mechanism on the indexer or rotary drive 18. Typical operation of the apparatus embodiment shown may be described with reference to FIGS. 1 and 3. Before the apparatus is started, the tray nearest the rear or input end, which may be designated as station #1, is level with the side loading conveyor. The next tray (station #2) is at a level that is lower by the same distance as the height of one product unit, and the third tray in line (station #3) is lower by the distance of twice the height of one product unit. If the accumulated stack of product is to be more than three, then a fourth tray (station #4) can be utilized at a level below the side conveyors that is three times the product height. Before the apparatus is started, the second and third trays (and fourth, if it is used) are preloaded with one and two layers of product, respectively, so that first tray surface and the partially loaded second and third trays form a uniform unilevel surface adjacent the side conveyors.

Now, the side conveyors 26 are activated and product 27 is fed onto them until the photocell 28 detects that the line of product has reached the backwall at the end of the left conveyor belt.

Now, the photocell 30 at the inlet end of the left conveyor belt, which is equipped with an internal time delay, senses that the left conveyor belt is completely full of product, and it then activates a left product stop actuator 34 to stop the incoming flow of product. At the same time, the left infeed conveyor belt 26 is stopped. On the opposite or right infeed belt, a photocell 28a detects that product has reached the backwall at the end of the right conveyor belt. A photocell 30a at the inlet end of the right conveyor, equipped with an internal time delay, senses that the right conveyor belt is completely full of product, and activates the right product stop 32a to stop the incoming flow of product. At the same time, the right conveyor belt 26a is stopped. Since stations #2, #3, and #4 have been primed, as previously described, a photocell 116 detects that the primed product is in place on the conveyor belts before further automatic operation can occur, and it therefore activates both left and right product push-over actuators 40 and 40a to stroke the product from the conveyor belts onto the descender trays.

The limit switches 42 and 44 indicate when the product push-over actuators 40 have reached full stroke and have returned to their retracted positions. Now, before the indexing drive 18 is activated to move the trays forwardly, the photocell 58 must be clear to insure that the lowermost tray (station #7) is empty. Also, the switch 54 must be closed to insure that the pull-in actuator 52 is out of the path of the trays. When signals from these latter elements are properly supplied, the indexer drive 20 operates to rotate the drive sprockets to move the chains a predetermined distance, thereby shifting the descender trays 24 down one station. The indexer is stopped after each activation by the action of the eccentric cam operated switch 22.

The aforesaid steps are repeated twice until a full pack of product is delivered to the bottom loading station #7, where the presence of a full pack is detected by the photocell 58. At this point, the pull-in actuator 52 operates, transferring the product pack to the elevator 48 for loading into a packing case. The sensor switch 56 is used to indicate that the pack is positioned beneath an open carton ready for loading. As the elevator 48 lifts up, the pull-in actuator 52 returns to the sensor switch 54. During the pull-in operation, more product has been accumulated, as previously described. Thus, the accumulating or stacking cycle repeats continuously, with indexing being followed by a pull-in operation and accumulation of fresh products.

In providing the automatic operation of the apparatus 10, as described, the various sensors, switches and position indicators may all be connected in the conventional manner to a standard electrical logic control device such as a microprocessor chip or integrated circuit device (not shown). Such devices are well known to those skilled in the art and are commercially available, together with complete instructions for connecting the sensors and for programming the necessary response signals. For example, the apparatus as shown, may be automatically controlled using a programmable controller (No. 5 T. I.) manufactured by Texas Instruments Incorporated.

In the drawing of the embodiment described, the articles 27 being accumulated are shown as typical tub-like containers for products such as margarine. However, it should be apparent that the apparatus 10 of the present invention could be used for accumulating and stacking a wide variety of products in many different packaged or unpackaged articles including cartons, cans, bags, etc. Also, while the apparatus 10 is particularly useful in conjunction with a bottom loading container packaging apparatus, it could also be highly useful with other loading apparatus such as carton end loaders. In all applications, the present invention provides an efficient article stacking and accumulating device with a high cycling rate.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An apparatus for accumulating and stacking a plurality of articles into a number of tiers for subsequent loading into a shipping container, said apparatus comprising:

chain means extending around drive sprocket means at one end and idler sprocket means at its other end, said idler sprocket means being at a higher elevation than said drive sprocket means so that said chain means is inclined at a predetermined angle;

rotary power means for turning said drive sprocket means to move said chain means in one direction;

a plurality of tray means, each having a flat surface for supporting said articles;

means for connecting said tray means in consecutive order along said chain means, so that their flat surfaces are maintained horizontally and are stepped downwardly from said idler sprocket means to said drive sprocket means on the upper side of said chain means;

an inlet feed means adjacent to at least one side of said chain means for receiving a line of articles to be stacked;

means for accumulating a predetermined number of articles in an adjacent side by side order on said inlet feed means;

pushing means for moving the accumulated articles on said inlet feed means onto a plurality of adjacent tray means including an uppermost tray that is empty and at least one adjacent tray in line that is partially loaded so that a substantially continuous flat surface of the same level is provided adjacent said conveyor means;

means for activating said rotary power means to index said chain means a predetermined distance after said pushing means has completed the movement of articles onto a plurality of trays; and pull-out means for moving an accumulated stack of articles from a lowermost horizontal tray to an adjacent surface after said chain means have been indexed forwardly by said rotary power means.

2. The apparatus as described in claim 1 wherein said chain means comprises a pair of spaced apart chains, each extending around a drive sprocket at one end and an idler sprocket at its other end.

3. The apparatus as described in claim 2 wherein each said chain extends around a drive sprocket and an idler sprocket supported by a frame comprised of upper and lower interconnected rails, and guide means fixed to the upper side of each said rail for retaining and supporting said chain.

4. The apparatus as described in claim 1 wherein said inlet feed means comprises two conveyor belts on opposite sides of said chain means.

5. The apparatus as described in claim 1 wherein each said tray means comprises a body of sheet material having a smooth, planar upper surface, spaced apart and parallel flanges on its under surface, rear bearing means with aligned holes near the rear ends of said flanges and front bearing means near the front ends of said flanges with aligned open slots that are spaced farther from said body than said aligned holes, near pin means interconnecting said chain means and said rear bearing means and front pin means interconnecting said chain means and said slots of said front bearing means, whereby the upper surface of each said tray means will remain horizontal as it is moved downwardly along the upper side of said chain means and will move easily around said sprocket means.

6. The apparatus as described in claim 1 wherein said pushing means comprises a movable rigid fence member extending parallel to said conveyor means, and linear actuator connected to said fence member.

7. The apparatus as described in claim 1 wherein said pull-out means comprises a movable fence member located near said drive sprocket means and a linear actuator connected to said movable fence member.

8. The apparatus as described in claim 1 wherein said means for accumulating articles on said inlet feed means comprises a barrier and a first article sensor near the outlet end of said feed means, and a stop means and a second article sensor near the inlet end of said feed means, said stop means being operative in response to signals from said first and second sensors.

9. The apparatus as described in claim 8 wherein said second article sensor includes means providing a time delay after receipt of a signal from said first article sensor.

10. The apparatus as described in claim 1 including a third sensor means for detecting an accumulated stack of articles in a lowermost tray for operating said pull-out means from its starting position to move said stack of articles laterally and means for operating said rotary power means after said pull-out means has returned to its starting position.

* * * * *